United States Patent
Littlejohn et al.

(10) Patent No.: US 10,200,150 B2
(45) Date of Patent: Feb. 5, 2019

(54) DIGITAL RADIO CHANNEL ERROR DETECTION

(71) Applicant: iHeartMedia Management Services, Inc., San Antonio, TX (US)

(72) Inventors: Jeff Littlejohn, Cincinnati, OH (US); Abineshraj Rajagopal, Maineville, OH (US); Amit Deshpande, Mason, OH (US); Alan W. Jurison, Syracuse, NY (US); Charles E. Kirkendall, III, Martinsville, OH (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 30 days.

(21) Appl. No.: 15/408,081

(22) Filed: Jan. 17, 2017

(65) Prior Publication Data
US 2018/0205492 A1    Jul. 19, 2018

(51) Int. Cl.
*H04L 1/00* (2006.01)
*H04H 20/31* (2008.01)
*H04L 1/08* (2006.01)
*H04H 20/12* (2008.01)

(52) U.S. Cl.
CPC ........... *H04L 1/0041* (2013.01); *H04H 20/12* (2013.01); *H04H 20/31* (2013.01); *H04L 1/08* (2013.01); *H04H 2201/18* (2013.01)

(58) Field of Classification Search
CPC .......... H04L 1/0041; H04L 1/08; H04H 20/31
See application file for complete search history.

(56) References Cited

U.S. PATENT DOCUMENTS

| | | | |
|---|---|---|---|
| 8,542,593 B1* | 9/2013 | Kumar | H04L 1/0078 370/235 |
| 9,876,592 B2* | 1/2018 | Fuller | H04H 20/12 |
| 2007/0089148 A1* | 4/2007 | Oh | H04N 5/4401 725/90 |
| 2010/0281338 A1* | 11/2010 | Liu | H03M 13/3761 714/758 |
| 2013/0276065 A1* | 10/2013 | Kumar | H04L 63/062 726/3 |
| 2014/0126446 A1* | 5/2014 | Deivasigamani | H04W 52/0216 370/311 |
| 2016/0302093 A1* | 10/2016 | Fuller | H04H 60/29 |
| 2017/0277919 A1* | 9/2017 | Kozlov | G06Q 30/0185 |
| 2017/0289912 A1* | 10/2017 | Ishii | H04B 1/40 |
| 2017/0310743 A1* | 10/2017 | Aoyama | H04L 67/1006 |

* cited by examiner

*Primary Examiner* — Kyle Vallecillo
(74) *Attorney, Agent, or Firm* — Toler Law Group, PC

(57) ABSTRACT

A method includes determining, at a device, that transmission data indicates that first data was transmitted via a digital radio channel. The method also includes determining, at the device, that reception data indicates that second data was received via the digital radio channel. The first data has a first size that is less than a second size of the second data. The method also includes determining, at the device, whether an error occurred in transmission of the first data based on determining whether each of a plurality of portions of the first data is included at least once in the second data. Other aspects are also disclosed.

20 Claims, 8 Drawing Sheets

← First Data 140

No Error

Example 1: All Adjacent Match

No Error

Example 2: Non-Adjacent Match

Error

Example 3: Missing Portion

No Error

Example 4: Partly Non-Adjacent and Partly Adjacent Match

Error

Example 5: Out of Order

| Analysis Time 502 | Timestamp 182 (of Second Data 142) | Timestamp 172 (of First Data 140) |
|---|---|---|
| 2016-09-23 05:15:30 AM | 2016-09-23 05:15:00 AM | 2016-09-23 05:08:00 AM |
| 2016-09-23 05:30:30 AM | 2016-09-23 05:30:00 AM | 2016-09-23 05:23:00 AM |
| 2016-09-23 05:45:30 AM | 2016-09-23 05:45:00 AM | 2016-09-23 05:38:00 AM |
| 2016-09-23 06:00:30 AM | 2016-09-23 06:00:00 AM | 2016-09-23 05:53:00 AM |

FIG. 5

DIGITAL RADIO CHANNEL ERROR DETECTION

I. FIELD

The present disclosure relates to systems and methods of detecting errors in a digital radio channel.

II. BACKGROUND

In-band on-channel (IBOC) technology is used by amplitude modulation (AM) radio stations and frequency modulation (FM) radio stations to transmit data using a digital signal embedded "on-frequency" above and below a station's analog signal. IBOC technology provides a radio station the ability to broadcast digital data in addition to the program being transmitted via an analog signal on the station's radio channel. A commercial name associated with IBOC technology is HD Radio® (registered trademark of iBiquity Digital Corp. of Columbia, Md.).

Due to packet loss, hardware problems, or other reasons, the data received by a device from the station via the digital radio signal may be erroneous or out-of-date. Because of the one-way nature of radio station broadcasting, conventional acknowledgment/negative acknowledgment (ACK/NACK) approaches of error detection may not be available. Discrepancy in the received data may adversely impact user experience. For example, the receiver device may display inaccurate data, stale data, or no data. To illustrate, the data may include traffic information and discrepancy in the received data may cause the receiver device to display inaccurate traffic information.

III. SUMMARY

Systems and methods of digital radio channel error detection are disclosed. The described error detection operations, which may be based on comparison of first data transmitted from a radio station to second data received at a device, may result in a more enjoyable user experience. For example, a provider device may provide first data to the radio station for broadcast and a receiver device may receive second data that is broadcast by the radio station. An error detector may receive transmission data from the provider device indicating that the first data is (or was) transmitted by the radio station. The error detector may also receive reception data from the receiver device indicating that the second data is (or was) received from the radio station.

The error detector may compare the first data to the second data, for example to confirm that each and every portion of the first data is present at least once in the second data and therefore was successfully received by the receiver device. Adjacent portions of the first data may be present adjacently or non-adjacently in the second data. In response to determining that an error is detected in transmission of the first data, an error notification may be sent to the receiver device, or to an employee of the radio station. The receiver device may, in response to receiving the error notification, provide default data (e.g., a default image) to a display device. Displaying the default image (e.g., a logo) may improve user experience, as compared to displaying a corrupted image. The employee of the radio station may take corrective actions to reduce (e.g., prevent) future transmission errors, thereby increasing accuracy of data subsequently provided to the receiver device and improving user experience.

In a particular aspect, a method includes determining, at a device, that transmission data indicates that first data was transmitted via a digital radio channel. The method also includes determining, at the device, that reception data indicates that second data was received via the digital radio channel. The first data has a first size that is less than a second size of the second data. The method also includes determining, at the device, whether an error occurred in transmission of the first data based on determining whether each of a plurality of portions of the first data is included at least once in the second data.

In another particular aspect, a system includes a processor configured to determine that transmission data indicates that first data was transmitted via a digital radio channel. The processor is also configured to determine that reception data indicates that second data was received via the digital radio channel. The processor is further configured to determine whether an error occurred in transmission of the first data based on a comparison of adjacent portions of the first data to non-adjacent portions of the second data.

In another particular aspect, a computer-readable storage device storing instructions that, when executed by a processor, cause the processor to perform operations including determining that transmission data indicates that first data was transmitted via a digital radio channel. The operations also include determining that reception data indicates that second data was received via the digital radio channel. The first data has a first size that is less than a second size of the second data. The operations further include determining whether an error occurred in transmission of the first data based on determining whether each of a plurality of portions of the first data is included at least once in the second data.

Aspects, advantages, and features of the present disclosure will become apparent after review of the entire application, including the following sections: Brief Description, Detailed Description, and the Claims.

IV. BRIEF DESCRIPTION

FIG. 5 is a chart of a particular aspect of analysis times and data timestamps of data used to perform error detection by the device of FIG. 1;

V. DETAILED DESCRIPTION

Figure 1:
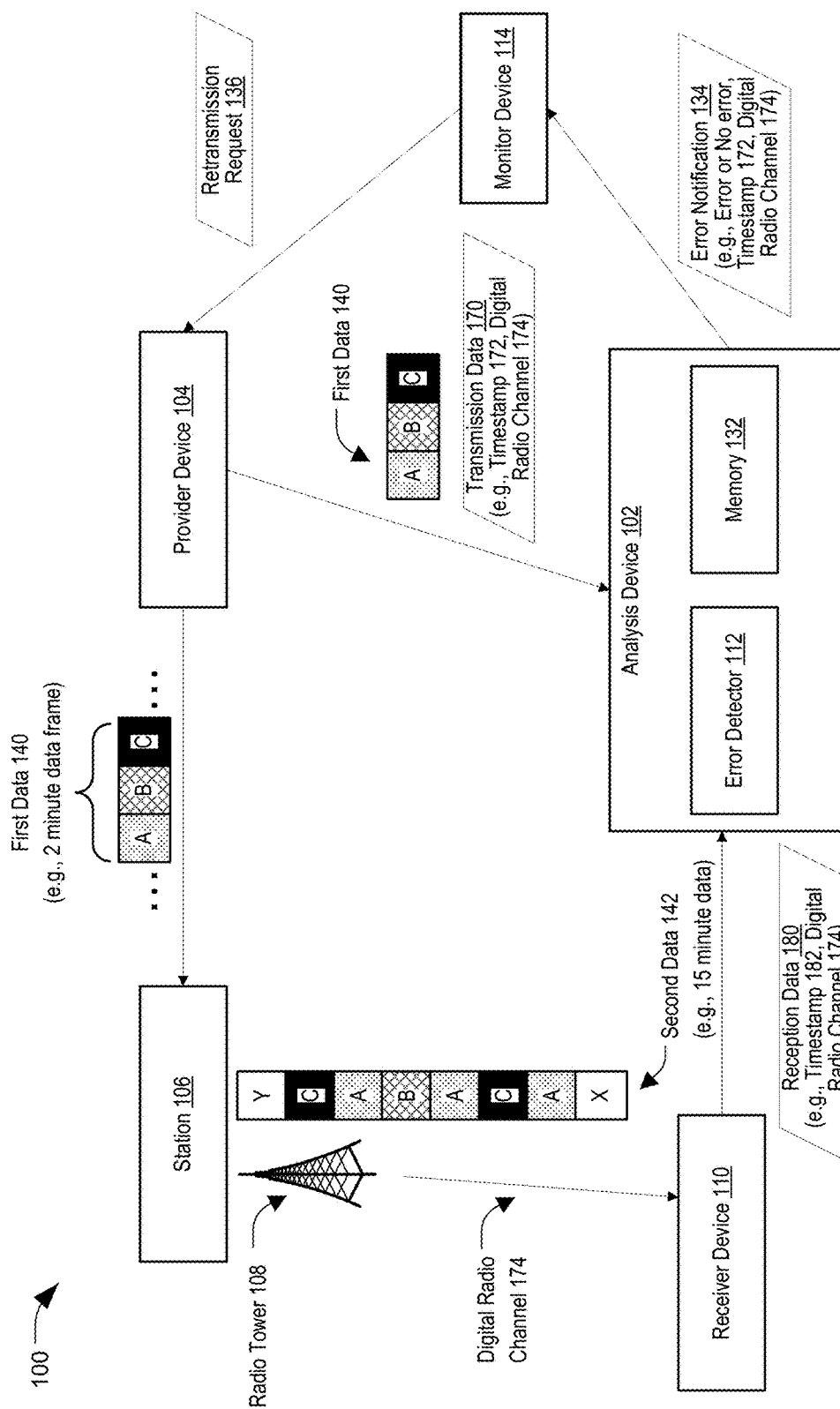
FIG. 1 is a block diagram of a particular illustrative aspect of a system that includes a device that is operable to detect errors in data communicated over a digital radio channel.

The terminology used herein is for the purpose of describing particular aspects only and is not intended to be limiting of the claims. As used herein, the singular forms "a," "an,"

and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In particular examples of systems compatible with the present disclosure, a provider device may be coupled to or included in a radio station. The provider device may be associated with a particular media provider. The provider device may be configured to provide data to the radio station for transmission via a digital radio channel. The data provided by the provider device may include traffic data, weather data, emergency alert data, public alert data, image data, album art data, title data, artist data, genre data, album data, radio program associated data, radio program title data, radio program image, radio program logo, electronic programming guide (EPG) data, station logo data, commercial entity data, non-commercial entity data, government entity data, communication data, streamed data, station data, related digital channel data, internet streaming data, audio encoding data, quality data, silence monitoring data, codec performance data, channel availability data, modulation error ratio (MER) diagnostics data, blending bit status data, analog to digital time alignment measurement data, hardware versioning data, software versioning data, streaming data, or a combination thereof. As referred to herein, a "digital radio channel" corresponds to a particular frequency (e.g., a frequency modulation (FM) frequency or an amplitude modulation (AM) frequency) or a particular frequency range (e.g., a frequency band) used by the radio station to transmit a digital signal.

In some implementations, the radio station may use the same (or approximately the same) frequency to transmit an analog signal. For example, the radio station may transmit a digital signal via a digital radio channel concurrently with transmitting an analog signal via an analog radio channel. The digital radio channel may correspond to the same frequency range (e.g., around 96.7 FM) as the analog radio channel. The radio station may use IBOC technology (e.g., HD Radio® technology) to transmit the digital signal concurrently with the analog signal. As an example, the analog signal may broadcast a voice of a traffic anchor delivering a traffic report during rush hour and the digital signal may communicate data that represents a traffic map indicating traffic conditions. An end user in a car receiving the digital radio channel may view the traffic map on a display device (e.g., a navigation screen) while listening to the voice of the traffic anchor via a speaker system.

In some implementations, the radio station may transmit the digital signal independently of an analog signal. For example, the radio station may use the particular frequency (or the particular frequency range) to transmit the digital signal and may refrain from using the particular frequency (or the particular frequency range) to transmit any analog signals.

The provider device provides first data to the radio station and the radio station transmits the first data via a digital radio channel during a transmission period (e.g., a 15 minute period). For example, the radio station may transmit, via a radio tower, a digital signal representing the first data via a particular frequency (or a particular frequency range) associated with the digital radio channel. In some implementations, the radio station may transmit the digital signal concurrently with transmitting an analog signal via the particular frequency (or the particular frequency range). For example, the digital signal may be embedded "on-frequency" above and below the analog signal. If a transmission time (e.g., 2 minutes) that it takes to transmit the first data is shorter than the transmission period (e.g., 15 minutes), the radio station transmits the first data multiple times until the end of the transmission period. To illustrate, if a traffic map takes 2 minutes to transmit and is updated every 15 minutes, the radio station may repeatedly broadcast the traffic map for 15 minutes until a new traffic map is available for broadcast. The traffic map may be repeatedly transmitted 7.5 times during the 15 minutes before transmission of the new traffic map. It should be understood that "15 minutes" is used herein as an example of the transmission period. The transmission period may be of any duration (e.g., 15 seconds, 30 seconds, 1 minute, 5 minutes, 15 minutes, 30 minutes, etc.).

A receiver device may tune (e.g., start receiving data corresponding) to the particular frequency (or the particular frequency range) associated with the digital radio channel at any time during the transmission period. Transmitting the first data multiple times may increase a likelihood of the receiver device receiving the first data, regardless of when the receiver device tunes to the digital radio channel during the transmission period. In addition, transmitting the first data multiple times may increase likelihood of the receiver device receiving each portion (e.g., byte frame array) of the first data at least once without error.

A receiver device receives second data during a radio broadcast period (e.g., 15 minutes). For example, the receiver device may receive, during the radio broadcast period, a digital signal via the particular frequency (or the particular frequency range) associated with the digital radio channel. The digital signal may represent the second data. In some implementations, the receiver device may receive an analog signal substantially concurrently to receiving the digital signal. It should be understood that "15 minutes" is used herein as an example of the radio broadcast period. The radio broadcast period may be of any duration (e.g., 15 seconds, 30 seconds, 1 minute, 5 minutes, 15 minutes, 30 minutes, etc.).

An error detector is configured to perform a comparison of the first data and the second data. The error detector may be included in an analysis device, the provider device, the receiver device, or the radio station. The error detector may perform a comparison of the first data broadcast by the radio station and the second data received by the receiver device. For example, the error detector may confirm that the 15 minutes of data received by the receiver device includes each and every portion of the traffic map at least once without error. In various implementations, the error detector may be at the provider device, at the receiver device, or at an analysis device external to both the provider device and the receiver device.

Various operations may be performed in response to determining that an error occurred in transmission of the first data. For example, an alert message may be stored in a memory, provided to a display, sent to another device, or a combination thereof. To illustrate, the error detector may send an error notification to a monitor device indicating that an error is detected in transmission of the first data. The monitor device may send a notification to the receiver device that the first data is erroneous. The receiver device may provide a default image (e.g., a channel logo) to a display device. Displaying the default image may be preferred to displaying erroneous data (e.g., an inaccurate traffic map). Diagnostic tests may be triggered at the provider device, the receiver device, the radio station, or any combination thereof. For example, the provider device may, in response to receiving an error notification from the monitor device, run diagnostic tests on a transmitter used to transmit the first data, retransmit the first data, or both.

Referring to FIG. 1, a particular illustrative aspect of a system is disclosed and generally designated 100. The system 100 includes a station 106 (e.g., a radio station) coupled to a radio tower 108. The station 106 may be coupled, via a network, to one or more provider devices. For example, the station 106 is communicatively coupled, via a network, to a provider device 104. The provider device 104 may be associated with a particular media provider. The network may include a wired network, a wireless network, or both. The station 106 may also be communicatively coupled to a receiver device 110. For example, the receiver device 110 may be within a coverage area of the radio tower 108. In a particular aspect, the receiver device 110 includes a test device used to monitor transmissions from the station 106. In another aspect, the receiver device 110 includes an end-user device. In a particular aspect, the receiver device 110 includes a stationary device within the coverage area of the radio tower 108. In another aspect, the receiver device 110 includes a mobile device that may move in or out of the coverage area of the radio tower 108. It should be understood that a radio station is used herein as an illustrative example of the station 106. In some implementations, the station 106, the radio tower 108, or a combination thereof, may correspond to a satellite or another type of communication device. The receiver device 110 may be configured to receive data from the radio tower 108 using one or more communication technologies, such as wireless communication, wired communication, radio frequency (RF) communication, infra-red communication, optical communication, terrestrial communication, non-terrestrial communication, or a combination thereof.

The system 100 may further include an analysis device 102 communicatively coupled to the receiver device 110 and to the provider device 104. In a particular aspect, one or more components of the analysis device 102 may be included in the receiver device 110, the provider device 104, or the station 106. The analysis device 102 includes an error detector 112 and a memory 132. The system 100 may also include a monitor device 114 coupled to the analysis device 102, the provider device 104, or both. In a particular aspect, one or more components of the monitor device 114 may be included in the analysis device 102.

The provider device 104 is configured to provide first data 140 to the station 106. The first data 140 may include traffic data, weather data, emergency alert data, public alert data, image data, album art data, title data, artist data, genre data, album data, radio program associated data, radio program title data, radio program image, radio program logo, electronic programming guide (EPG) data, station logo data, commercial entity data, non-commercial entity data, government entity data, communication data, streamed data, station data, related digital channel data, internet streaming data, audio encoding data, quality data, silence monitoring data, codec performance data, channel availability data, modulation error ratio (MER) diagnostics data, blending bit status data, analog to digital time alignment measurement data, hardware versioning data, software versioning data, streaming data, or a combination thereof. The station 106 is configured to transmit the first data 140 via a digital radio channel 174. The digital radio channel 174 may correspond to a particular frequency (e.g., a FM frequency or an AM frequency) or a particular frequency range (e.g., a FM frequency range or an AM frequency range). The station 106 may use the particular frequency (or the particular frequency range) to transmit, via the radio tower 108, a digital signal representing the first data 140. In the example of FIG. 1, the first data 140 is annotated as being a "2 minute data frame" to indicate that it would take 2 minutes for the radio tower 108 to transmit the first data 140 via the digital radio channel 174. It should be understood that in other implementations, it may take the radio tower 108 longer than or shorter than 2 minutes to transmit the first data 140.

In some implementations, the station 106 may use IBOC technology (e.g., HD Radio® technology) to transmit the digital signal concurrently with an analog signal. The analog signal may represent radio programming content (e.g., a news program, a music program, or an entertainment program). For example, the station 106 may use the particular frequency (or the particular frequency range) to transmit, via the radio tower 108, an analog signal representing the programming content concurrently with transmission of the digital signal. In a particular aspect, the station 106 uses the particular frequency (or the particular frequency range) to transmit the analog signal and uses subcarriers or sidebands to multiplex the digital signal on the analog signal. In a particular aspect, the analog signal may broadcast music tracks and the digital signal may communicate data that represents an image of an artist associated with a corresponding music track. An end user in a car receiving the digital radio channel may view the image of the artist on a display device (e.g., an entertainment system display) while listening to the music tracks via a speaker system.

The receiver device 110 is configured to receive, via the digital radio channel 174, second data 142 from the station 106. For example, the receiver device 110 may be within a coverage area of the radio tower 108 and may receive a digital signal, an analog signal, or both, via the particular frequency (or the particular frequency range) associated with the digital radio channel 174 from the radio tower 108. The receiver device 110 may perform signal processing to determine that the digital signal represents the second data 142. In a particular aspect, the digital signal represents a traffic map that is updated every 15 minutes. The receiver device 110 may extract portions of the first data 140 from the second data 142 received via the digital signal during a 15 minute radio broadcast period. The receiver device 110 may provide an image based on the first data 140 to a display device. The receiver device 110 may update the image displayed on the display device based on data received via the digital radio channel during subsequent 15 minute radio broadcast periods. In some implementations, the traffic map may be updated at shorter intervals than 15 minutes or longer intervals than 15 minutes.

The analysis device 102 may be configured to receive the first data 140 from the provider device 104, the second data 142 from the receiver device 110, or both. The error detector 112 is configured to determine whether an error occurred during transmission of the first data 140 by the radio tower 108 or during reception of the second data 142 by the receiver device 110 based on a comparison of the first data 140 and the second data 142. The error detector 112 is configured, in response to determining that an error occurred, to provide an error notification 134 to the monitor device 114.

The monitor device 114 is configured to perform various operations in response to receiving the error notification 134, as further described herein. For example, the monitor device 114 may update an error log based on the error notification 134, send an alert to a device of a radio station employee associated with the station 106, send the error notification 134 to the receiver device 110, send a retransmission request 136 to at least one of the provider device 104 or the station 106 to retransmit the first data 140, initiate diagnostic tests at the provider device 104, the receiver device 110, the station 106, or any combination thereof.

During operation, the provider device 104 sends the first data 140 to the station 106 for broadcast from the radio tower 108 via the digital radio channel 174. For example, the provider device 104 may generate data for the station 106 to repeatedly broadcast during a transmission time period (e.g., fifteen minutes). To illustrate, the first data 140 may represent advertisements of products that a talk show host may be discussing. The advertisement may be for display, during a time period (e.g., a fifteen minute period), at a display device concurrently with output of the talk show host's voice via a speaker system. The first data 140 may be repeatedly broadcast by the station 106 during the transmission time period. For example, if the first data 140 takes two minutes to transmit and is to be transmitted during a fifteen minute long transmission time period from 5:00 AM to 5:15 AM, the first data 140 may be repeated 7.5 times during the transmission time period. The receiver device 110 may thus receive one or more copies of the first data 140 during the transmission period. The first data 140 may include a plurality of portions (e.g., denoted A, B, C in FIG. 1). In the presence of transmission errors, some portions of some transmitted copies of the first data 140 may be lost or received with errors. Transmitting multiple copies of the first data 140 increases likelihood of the receiver device 110 receiving each of the plurality of portions in at least one of the transmitted copies of the first data 140.

The provider device 104 may provide transmission data 170 and the first data 140 to the analysis device 102. The transmission data 170 may include the timestamp 172 and an indicator of the digital radio channel 174. For example, the transmission data 170 may indicate that the provider device 104 initiated transmission of a particular copy (e.g., a fourth copy) of the first data 140 via the digital radio channel 174 at 5:08 AM.

The provider device 104 may continue to provide data to the station 106 for broadcast. For example, the provider device 104 may have additional data stored in a buffer to be transmitted, via the digital radio channel 174, subsequent to the first data 140. The provider device 104 may provide the additional data to the station 106 for broadcast via the digital radio channel 174.

The station 106 may transmit, from the radio tower 108, the first data 140 via the digital radio channel 174. For example, the radio tower 108 may transmit the first data 140 as a digital signal via the particular frequency (or the particular frequency range) associated with the digital radio channel 174. In some implementations, the radio tower 108 transmits, via the particular frequency (or the particular frequency range), the first data 140 as the digital signal concurrently with transmitting other data as an analog signal. In alternate implementations, the radio tower 108 transmits the first data 140 independently of transmitting any analog signals.

The receiver device 110 may receive second data 142 from the radio tower 108 via the digital radio channel 174. For example, the receiver device 110 may designate data received from the radio tower 108 via the digital radio channel 174 between 5:00 AM and 5:15 AM as the second data 142. To illustrate, the first data 140 may be included 7.5 times in the second data 142 without errors if there are no errors in transmission and reception of the first data 140.

The receiver device 110 may provide reception data 180, the second data 142, or both, to the analysis device 102. The reception data 180 may include an indicator of the digital radio channel 174, a timestamp 182, or both. For example, the reception data 180 may indicate that the receiver device 110 received (or finished receiving) the second data 142 via the digital radio channel 174 at 5:15 AM.

The analysis device 102 may receive, via a network, the first data 140, the transmission data 170, or both, from the provider device 104, and may store the first data 140, the transmission data 170, or both, in the memory 132. The analysis device 102 may receive, via a network, the second data 142, the reception data 180, or both, from the receiver device 110, and may store the second data 142, the reception data 180, or both, in the memory 132.

Figure 2:
FIG. 2 is a diagram of a particular illustrative examples of error detection by the device of FIG. 1.
Figure 2:
Figure 2:
Figure 2:
Figure 2:
Figure 2:
Figure 2:
Figure 2:
Figure 2:
Figure 2:
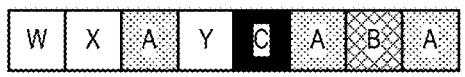
Figure 2:

The error detector 112 may, at an analysis time (e.g., 5:15:30 AM), compare the second data 142 received from the receiver device 110 to the first data 140, as further described with respect to FIG. 2. In a particular aspect, the analysis time (e.g., 5:15:30 AM) may be subsequent to a time (e.g., 5:15 AM) indicated by the timestamp 182 to account for a delay (if any) between the receiver device 110 receiving the second data 142 from the station 106 and the analysis device 102 receiving the second data 142 or the reception data 180 from the receiver device 110.

The error detector 112 may determine whether an error is detected in transmission of the first data 140 based on the comparison of the second data 142 and the first data 140, as further described with reference to FIG. 2. For example, the first data 140 may include a plurality of portions (e.g., A, B, C). Each portion of the plurality of portions may correspond to a particular number of bits (e.g., a byte), a byte array frame, an array element, a list element, a set element, or another data unit. The error detector 112 may determine that no error is detected in transmission of the first data 140 in response to determining that each of the plurality of portions (e.g., A, B, C) is included, without error or with no more than a threshold number of errors, at least once in the second data 142. In some examples, the threshold number of errors may correspond to a bit error correction capability provided by a data encoding scheme that is in use. In the example illustrated in FIG. 1, the second data 142 includes each of the plurality of portions (e.g., A, B, C) at least once, so the error detector 112 may determine that no error occurred during transmission of the first data 140. Alternatively, the error detector 112 may determine that an error is detected in transmission of the first data 140 in response to determining that at least one of the plurality of portions (e.g., A, B, C) is absent from the second data 142 or includes more than a threshold number of errors, as further described with reference to FIG. 2. The error in transmission of the first data 140 may include a network package error, transmission of out-of-date data by the station 106, a data quality error, or a combination thereof.

The error detector 112 may generate the error notification 134 based on determining whether an error is detected in transmission of the first data 140 via the digital radio channel 174. For example, the error detector 112 may, in response to determining that an error is detected in transmission of the first data 140, generate the error notification 134 to have a first value (e.g., 1). As another example, the error detector 112 may, in response to determining that no error is detected in transmission of the first data 140, generate the error notification 134 to have a second value (e.g., 0). The error notification 134 may include (or indicate) the timestamp 172, the timestamp 182, an indicator of the digital radio channel 174, the first data 140, or a combination thereof. The analysis device 102 may provide the error notification 134 to the monitor device 114.

The monitor device 114 may perform various operations in response to receiving the error notification 134. For example, the monitor device 114 may update an error log in response to receiving the error notification 134. To illustrate, the monitor device 114 may update the error log to indicate that an error is detected in transmission of data (e.g., the first data 140) via the digital radio channel 174 at a first time indicated by the timestamp 172, at a second time indicated by the timestamp 182, or both. Alternatively, the monitor device 114 may update the error log to indicate successful transmission of data (e.g., the first data 140) via the digital radio channel 174 at a first time indicated by the timestamp 172.

As another example, the monitor device 114 may send an alert based on the error notification 134 to a device of an employee associated with at least one of the station 106, the provider device 104, the receiver device 110, the analysis device 102, or the monitor device 114. The alert may indicate whether an error is detected in transmission of data (e.g., the first data 140) via the digital radio channel 174 at a first time indicated by the timestamp 172, at a second time indicated by the timestamp 182, or both. The employee may take corrective measures in response to receiving the alert. For example, the employee may replace faulty hardware at the station 106 in response to receiving the alert.

As another example, the monitor device 114 may send the error notification 134 to the receiver device 110. When no error is detected, the receiver device 110 may extract the plurality of portions (e.g., A, B, C) of the first data 140 from the second data 142. The receiver device 110 may provide the plurality of portions (e.g., A, B, C) to a display device. Alternatively, when an error is detected, the receiver device 110 may use default data in place of the first data 140 (or the second data 142). For example, the receiver device 110 may discard (or ignore) the second data 142 in response to determining that the second data 142 is likely to be erroneous. The receiver device 110 may provide default data (e.g., a default image of a logo) to the display device, as compared to providing erroneous portions (e.g., A, B, and/or C) to the display device.

In a particular example, the receiver device 110 may receive the error notification 134 subsequent to a time at which the first data 140 was to be displayed at the display device. The error notification 134 may indicate that an error is detected in transmission of the first data 140. In such a scenario, the receiver device 110 may determine that data received subsequently via the digital signal corresponding to the digital radio channel 174 is also likely to have errors. In response, the receiver device 110 may provide default data to the display device until receiving a reset notification. To illustrate, an employee of the radio station may take corrective measures in response to a device of the employee receiving an alert that an error is detected in transmission of the first data 140. The receiver device 110 may receive the reset notification from the station 106 subsequent to the employee performing the corrective measures.

As another example, the monitor device 114 may send the retransmission request 136 to at least one of the provider device 104 or the station 106 to retransmit the first data 140. Alternatively, or in addition, the monitor device 114 may initiate diagnostic tests at the provider device 104, the receiver device 110, the station 106, or a combination thereof.

The system 100 may thus enable the analysis device 102 to detect an error (if any) in transmission of the first data 140 via the digital radio channel 174. Various operations may be performed to improve user experience and to initiate corrective measures in response to detecting an error in transmission of the first data 140.

Referring to FIG. 2, a diagram is shown and generally designated 200. The diagram 200 illustrates various examples of error detection by the error detector 112 of FIG. 1. The diagram 200 includes second data 202, second data 204, second data 206, second data 208, and second data 210. Each of the second data 202-210 may correspond to illustrative examples of the second data 142 of FIG. 1.

The error detector 112 may perform a comparison algorithm on the first data 140 and the second data 142 (e.g., each of the second data 202-210 in the illustrated examples) to determine whether an error is detected in the transmission of the first data 140. The error detector 112 may process the second data 142 sequentially to determine if the second data 142 includes each of the plurality of portions (e.g., A, B, C) of the first data 140. An illustrative comparison algorithm corresponds to the following pseudo-code:

---

1. Initialize Index = 0, CURR_First_Portion = beginning portion (e.g., byte array frame (BAF)) of the first data 140.
2. LEN = SizeOf (CURR_First_Portion), CURR_Second_Portion = a byte array of size LEN at Index of the second data 142.
   3. Check if CURR_First_Portion is equal to the CURR_Second_Portion.
   3. (i). If CURR_First_Portion is equal to the CURR_Second_Portion: Index = Index + LEN, CURR_First_Portion = Next BAF of the first data 140; LEN = SizeOf (CURR_First_Portion).
   3. (ii). If CURR_First_Portion is not equal to the CURR_Second_Portion: Index = Index + 1.
4. Repeat steps 2-3 until one of the following conditions is reached:
   Condition (a): All BAFs of the first data 140 have been matched at least once in the second data 142. If Condition (a) is satisfied, no error is detected in transmission of the first data 140.
   Condition (b): Index > SizeOf (second data 142) − LEN. If Condition (b) is satisfied, an error is detected in transmission of the first data 140.

---

FIG. 2 illustrates examples of applying the comparison algorithm to the first data 140 and each of the second data 202-210 to determine whether an error is detected in transmission of the first data 140. In the following descriptions, portions being compared are surrounded by square brackets ("[ ]"). Example 1 of FIG. 2 illustrates a case where the error detector 112 determines that each of the plurality of portions (e.g., A, B, C) of the first data 140 matches adjacent portions of the second data 202.

The second data 202 includes a plurality of portions (e.g., W, X, A, B, C, A, B, C). The error detector 112 may compare a portion (A) of the first data 140 ([A], B, C) with a portion (W) of the second data 202 ([W], X, A, B, C, A, B, C). The error detector 112 may, in response to determining that the portion (A) is not equal to the portion (W), compare the portion (A) of the first data 140 ([A], B, C) to a next portion (X) of the second data 202 (W, [X], A, B, C, A, B, C). The error detector 112 may, in response to determining that the portion (A) of the first data 140 ([A], B, C) does not match the portion (X) of the second data 202, compare the portion (A) of the first data 140 ([A], B, C) to a next portion (A) of the second data 202 (W, X, [A], B, C, A, B, C).

The error detector 112 may, in response to determining that the portion (A) of the first data 140 ([A], B, C) matches the portion (A) of the second data 202 (W, X, [A], B, C, A, B, C), compare a next portion (B) of the first data 140 (A,

[B], C) to a next portion (B) (W, X, A, [B], C, A, B, C) of the second data 202. The error detector 112 may, in response to determining that the portion (B) of the first data 140 (A, [B], C) matches the portion (B) of the second data 202 (W, X, A, [B], C, A, B, C), compare a next portion (C) of the first data 140 (A, B, [C]) to a next portion (C) (W, X, A, B, [C], A, B, C) of the second data 202. The error detector 112 may, in response to determining that the portion (C) of the first data 140 (A, B, [C]) matches the portion (C) of the second data 202 (W, X, A, B, [C], A, B, C) and that each portion of the first data 140 (A, B, C) has been matched at least once in the second data 202 (W, X, [A], [B], [C], A, B, C), determine that no error is detected in transmission of the first data 140.

Example 2 of FIG. 2 illustrates a case where the error detector 112 determines that each of the plurality of portions (e.g., A, B, C) of the first data 140 is included at least once in the second data 204 based on a match between adjacent portions of the first data 140 to non-adjacent portions of the second data 204. The second data 204 includes a plurality of portions (X, A, C, A, B, A, C, Y).

The error detector 112 may determine, based on the comparison algorithm, that a portion (A) of the first data 140 ([A], B, C) matches a portion A of the second data 204 (X, [A], C, A, B, A, C, Y). The error detector 112 may determine that a portion (B) of the first data 140 (A, [B], C) matches a portion B of the second data 204 (X, A, C, A, [B], A, C, Y). Notably, the portion (B) of the first data 140 is adjacent to the portion (A) of the first data 140, whereas the portion (B) of the second data 204 is not adjacent to the previously matched portion (A) of the second data 204.

The error detector 112 may determine that a portion (C) of the first data 140 (A, B, [C]) matches a portion C of the second data 204 (X, A, C, A, B, A, [C], Y). Once again, the portion (C) of the first data 140 is adjacent to the portion (B) of the first data 140, whereas the portion (C) of the second data 204 is not adjacent to the previously matched portion (B) of the second data 204. The error detector 112 may, in response to determining that each portion of the first data 140 (A, B, C) has been matched at least once in the second data 204 (X, [A], C, A, [B], A, [C], Y), determine that no error is detected in transmission of the first data 140.

Example 3 of FIG. 2 illustrates a case where the error detector 112 determines that at least one of the plurality of portions (e.g., A, B, C) of the first data 140 is absent from the second data 206. The second data 206 includes a plurality of portions (W, X, A, C, A, Y, A, C).

The error detector 112 may determine, based on the comparison algorithm, that a portion (A) of the first data 140 ([A], B, C) matches a portion A of the second data 206 (W, X, [A], C, A, Y, A, C). The error detector 112 may determine that a portion (B) of the first data 140 (A, [B], C) does not match any portions of the second data 206 (W, X, A, C, A, Y, A, C) that are subsequent to the previously matched portion (A) of the second data 206. The error detector 112 may, in response to determining that at least one portion of the first data 140 (A, [B], C) has not been matched to any portion of the second data 206 (W, X, A, C, A, Y, A, C), determine that an error is detected in transmission of the first data 140.

Example 4 of FIG. 2 illustrates a case where the error detector 112 determines that each of the plurality of portions (e.g., A, B, C) of the first data 140 is included at least once in the second data 208 based at least in part on a match between two adjacent portions of the first data 140 to two non-adjacent portions of the second data 204 and a match of two adjacent portion of the first data 140 to two adjacent portions of the second data 208. The second data 208 includes a plurality of portions (W, X, A, C, A, Y, B, C).

The error detector 112 may determine, based on the comparison algorithm, that a portion (A) of the first data 140 ([A], B, C) matches a portion A of the second data 208 (W, X, [A], C, A, Y, B, C). The error detector 112 may determine that a portion (B) of the first data 140 (A, [B], C) matches a portion B of the second data 208 (W, X, A, C, A, Y, [B], C). The portion (B) of the first data 140 is adjacent to the portion (A) of the first data 140, whereas the portion (B) of the second data 208 is not adjacent to the previously matched portion (A) of the second data 208.

The error detector 112 may determine that a portion (C) of the first data 140 (A, B, [C]) matches a portion C of the second data 208 (W, X, A, C, A, Y, B, [C]) that is subsequent to the previously matched portion (B) of the second data 208. The portion (C) of the first data 140 is adjacent to the portion (B) of the first data 140, whereas the portion (C) of the second data 208 is not adjacent to the previously matched portion (B) of the second data 208. The error detector 112 may, in response to determining that each portion of the first data 140 (A, B, C) has been matched at least once in the second data 208 (W, X, [A], C, A, Y, [B], [C]), determine that no error is detected in transmission of the first data 140.

Example 5 of FIG. 2 illustrates a case where, although the second data 210 includes each of the plurality of portions (A, B, C), the error detector 112 determines based on the comparison algorithm that an error is detected in transmission of the first data 140 because the second data 210 is analyzed sequentially, as described herein. The second data 210 includes a plurality of portions (W, X, A, Y, C, A, B, A).

The error detector 112 may determine, based on the comparison algorithm, that a portion (A) of the first data 140 ([A], B, C) matches a portion A of the second data 210 (W, X, [A], Y, C, A, B, A). The error detector 112 may determine that a portion (B) of the first data 140 (A, [B], C) matches a portion B of the second data 210 (W, X, A, Y, C, A, [B], A) that is subsequent to the previously matched portion (A) of the second data 210.

The error detector 112 may determine that a portion (C) of the first data 140 (A, B, [C]) does not matches any portion of the second data 208 (W, X, A, Y, C, A, B, A) that is subsequent to the previously matched portion (B) of the second data 208 (W, X, A, Y, C, A, [B], A). The error detector 112 may, in response to determining that portion (C) of the first data 140 is not matched to any portion of the second data 208, determine that an error is detected in transmission of the first data 140. The error detector 112 may thus determine that an error is detected in transmission of the first data 140 although the portion (C) of the first data 140 (A, B, [C]) matches a portion (C) of the second data 208 (W, X, A, Y, [C], A, B, A) prior to the previously matched portion (B) of the second data 208 (W, X, A, Y, C, A, [B], A).

In an alternate implementation, the error detector 112 may use another comparison algorithm to compare a next portion of the first data 140 to each unmatched portion of the second data 142 to determine whether the next portion matches at least one portion of the second data 142. Sequential processing of the second data 142 may be less complex (e.g., order of N) in terms of time, processing cycles, or both, in contrast to comparing the next portion of the first data 140 to each unmatched portion of the second data 142 (e.g., order of $N^2$). Cases where an error is detected based on the sequential processing of the second data 142 although each of the plurality of portions of the first data 140 is present in the second data 142 may indicate that at least some transmission errors (e.g., some received portions of some copies of the first data 140 were erroneous or lost) occurred in transmission of the first data 140.

In some examples, an order of the plurality of portions (A, B, C) may be known and/or indicated by the portions. For example, each portion (e.g., byte array frame) of the first data 140 may include a sequence number (e.g., in a frame header). In such examples, the receiver device 110 may re-order received portions as needed based on the sequence numbers. When receiver devices have the ability to reorder portions, all-portions-received-but-out-of-order situations, such as the one shown in Example 5, may not be considered an error.

For ease of illustration, a portion of the first data 140 is illustrated in FIG. 2 as being compared to non-overlapping portions of the second data 142. It should be understood that in alternative implementations, a portion of the first data 140 may be compared to overlapping portions of the second data 142. For example, the error detector 112 may, in response to determining that a portion of the first data 140 does not match a first particular portion of the second data 142, compare the portion of the first data 140 to a second particular portion of the second data 142 such that the second particular portion of the second data 142 overlaps the first particular portion of the second data 142. In Example 1, the error detector 112 may, in response to determining that the portion (A) of the first data 140 ([A], B, C) does not match the portion (W) of the second data 202 ([W], X, A, B, C, A, B, C), compare the portion (A) of the first data 140 to portion (X) of the second data 202. The portion (X) (e.g., byte 1-byte 8) of the second data 202 may overlap the portion (W) (e.g., byte 0-byte 7) of the second data 202. Due to transmission errors, some transmitted bits may be absent from the second data 202. Comparing a portion of the first data 140 to overlapping portions of the second data 202 may increase likelihood of finding a matching portion.

Regardless of whether a portion of the first data 140 is compared to overlapping portions or non-overlapping portions of the second data 142 to find a match, a "next" portion of the first data 140 may be compared to a non-overlapping next portion of the second data 142 subsequent to finding the match. For example, the error detector 112 may, in response to determining that a portion of the first data 140 matches a first particular portion of the second data 142, compare a next portion of the first data 140 to a second particular portion of the second data 142 such that the second particular portion of the second data 142 is subsequent to (does not overlap) the first particular portion of the second data 142. Comparing a next portion of the first data 140 to a non-overlapping portion of the second data 202, subsequent to a match, may ensure that the same bits of the second data 202 are not matched to multiple portions of the first data 140.

Figure 3:
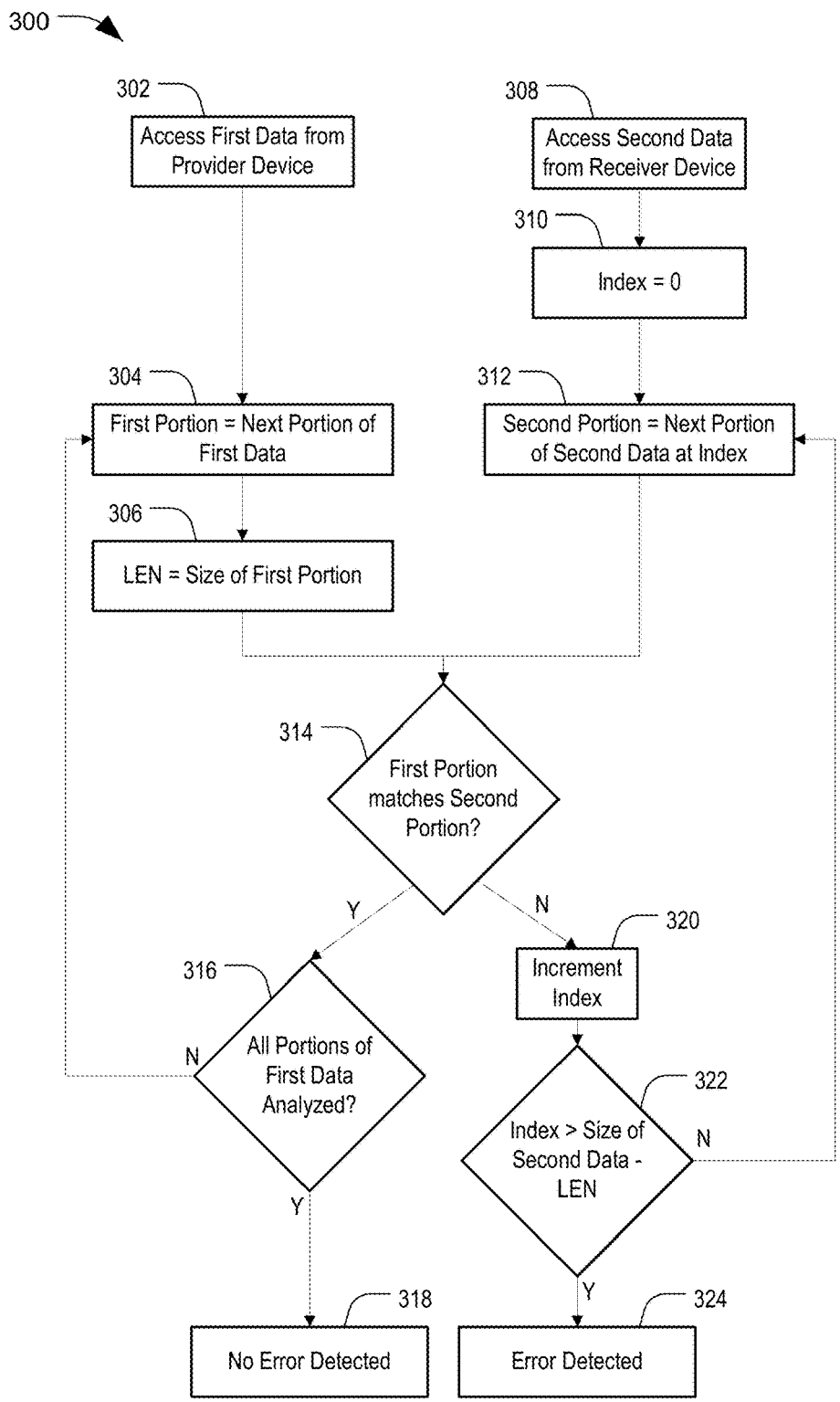
FIG. 3 is a flow chart to illustrate an aspect of a method of detecting errors in data communicated over a digital radio channel.

Referring to FIG. 3, a method of error detection is shown and generally designated 300. The method 300 may be performed by the error detector 112, the analysis device 102, the system 100 of FIG. 1, or a combination thereof.

The method 300 includes accessing first data from a provider device, at 302. For example, the error detector 112 of FIG. 1 may access the first data 140 received from the provider device 104, as described with reference to FIGS. 1-2.

The method 300 also includes designating a "next" portion of the first data as a first portion, at 304. For example, the error detector 112 of FIG. 1 may designate a next portion (A) of the first data 140 ([A], B, C) as a first portion (e.g., CURR_First_Portion), as described with reference to FIG. 2.

The method 300 further includes designating size of the first portion as LEN, at 306. For example, the error detector 112 of FIG. 1 may designate size of the first portion (e.g., LEN=size of (CURR_First_Portion)), as described with reference to FIG. 2.

The method 300 also includes accessing second data from a receiver device, at 308. For example, the error detector 112 of FIG. 1 may access the second data 142 received from the receiver device 110, as described with reference to FIGS. 1-2.

The method 300 further includes initializing Index to 0, at 310. For example, the error detector 112 of FIG. 1 may initialize Index to a particular value (e.g., 0), as described with reference to FIG. 2.

The method 300 also includes designating a "next" portion of the second data at the Index as a second portion, at 312. For example, the error detector 112 of FIG. 1 may designate a next portion of the second data 142 at the Index as a second portion, as described with reference to FIG. 2. To illustrate, the error detector 112 may designate a byte array of size LEN at Index of the second data 142 as the second portion (e.g., CURR_Second_Portion).

The method 300 further includes determining whether the first portion matches the second portion, at 314. For example, the error detector 112 of FIG. 1 may determine whether the first portion matches the second portion. The error detector 112 may determine that the first portion matches the second portion in response to determining that the first portion is the same (or substantially the same) as the second portion. For example, the error detector 112 may determine that the first portion matches the second portion in response to determining that less than a threshold number of bits in the second portion differ from corresponding bits in the first portion. The threshold number of errors may be based on an error correction tolerance of the error detector 112 or a data encoding scheme that is in use. In a particular aspect, the error detector 112 may perform error correction on the second portion and may determine that the first portion matches the second portion in response to determining that the first portion is the same as the error corrected version of the second portion.

The method 300 includes, in response to determining that the first portion matches the second portion, determining whether all portions of the first data have been analyzed, at 316. For example, the error detector 112 of FIG. 1 may, in response to determining that the first portion matches the second portion, determine whether all portions of the first data 140 have been analyzed (e.g., Condition (a)), as described with reference to FIG. 2. If at least one portion of the first data remains to be analyzed, the method 300 returns to 304 to designate a new first portion for comparison to the second portion.

The method 300 also includes, in response to determining that all portions of the first data have been analyzed, determining that no error is detected in transmission of the first data, at 318. For example, the error detector 112 of FIG. 1 may, in response to determining that all portions of the first data 140 have been analyzed, determine that no error is detected in transmission of the first data 140.

In response to determining that the first portion does not match the second portion, the method 300 includes incrementing the Index, at 320. For example, the error detector 112 of FIG. 1 may increment the Index in response to determining that the first portion does not match the second portion, as described with reference to FIG. 2.

The method 300 includes determining whether the Index is greater than a difference between size of the second data and LEN, at 322. For example, the error detector 112 of FIG. 1 may determine whether the Index is greater than a difference between a size of the second data 142 and LEN (e.g., Index>SizeOf (second data 142)—LEN), as described with reference to FIG. 2. When the Index is less than or equal to the difference between the second data and LEN, the method 300 returns to 312 to designate a new second portion for comparison to the first portion.

The method 300 includes, in response to determining that the Index is greater than the difference between the size of second data and LEN, determining that an error is detected in transmission of the first data, at 324. For example, the error detector 112 of FIG. 1 may determine that an error is detected in transmission of the first data 140 in response to determining that the Index is greater than the difference between the size of the second data 142 and LEN (e.g., Condition(b) is satisfied), as described with reference to FIG. 2.

The method 300 thus enables detecting an error in transmission of the first data 140 based on iterative portion-based comparison of the first data 140 and the second data 142. For example, a sequential comparison may be performed between portions of the first data 140 and portions of the second data 142 to determine whether each portion of the first data 140 is included at least once in the second data 142. The error detector 112 may determine that an error is not detected in response to determining that a matching portion is detected in the second data 142 corresponding to each portion of the first data 140. Alternatively, the error detector 112 may determine that an error is detected in response to determining that, for at least one portion of the first data 140$m$ a matching portion is not detected in the second data 142.

Figure 4:
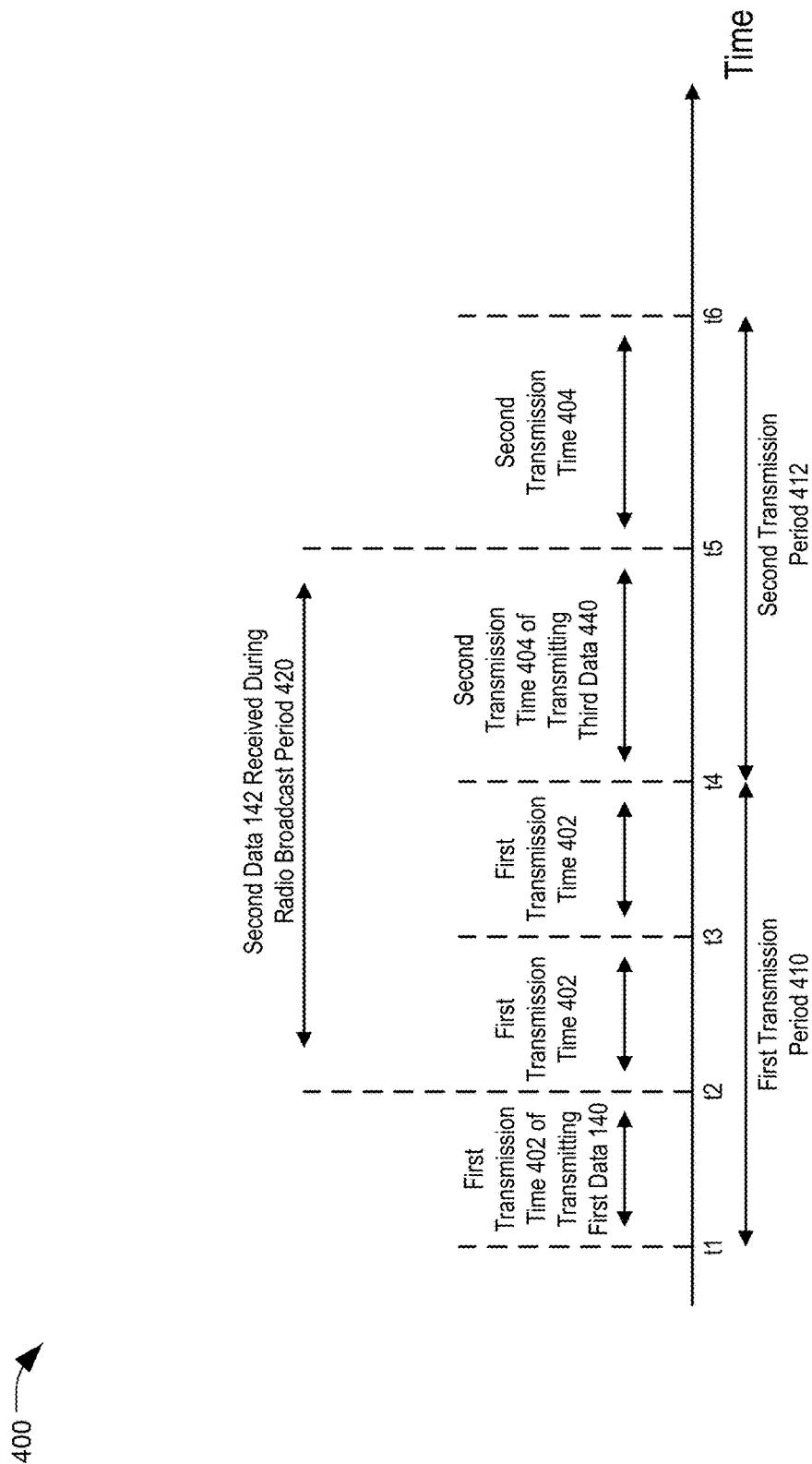
FIG. 4 is a timeline of an illustrative aspect of data transmission and data reception in the system of FIG. 1.

Referring to FIG. 4, a timeline is shown and generally designated 400. The timeline 400 may correspond to operations of the system 100 of FIG. 1.

The timeline 400 includes a first transmission period 410 that begins at time t1 and ends at time t4. The station 106 may transmit, via the radio tower 108, the first data 140 multiple times during the first transmission period 410, as described with reference to FIG. 1. For example, a first transmission time 402 may correspond to a transmission time it takes to transmit the first data 140. The station 106 may transmit a first copy of the first data 140 between the time t1 and a time t2, a second copy of the first data 140 between the time t2 and a time t3, and a third copy of the first data 140 between the time t3 and the time t4. Although FIG. 4 illustrates 3 copies of the first data 140 transmitted during the first transmission period 410, in other implementations fewer than 3 copies or more than 3 copies of the first data 140 may be transmitted during the first transmission period 410.

The timeline 400 includes a second transmission period 412 that begins at the time t4 and ends at a time t6. A second transmission time 404 may correspond to a transmission time to transmit the third data 440. The transmission time 404 may be longer than, same as, or shorter than the transmission time 402. For example, the transmission time 404 may be longer than the transmission time 402 if a size of the third data 440 is greater than a size of the first data 140. The station 106 may transmit, via the radio tower, third data 440 multiple times during the second transmission period 412. For example, the station 106 may transmit a first copy of the third data 440 between the time t4 and a time t5, and a second copy of the third data 440 between the time t5 and the time t6. Although FIG. 4 illustrates 2 copies of the third data 440 transmitted during the second transmission period 412, in other implementations fewer than 2 copies or more than 2 copies of the third data 440 may be transmitted during the second transmission period 412.

The receiver device 110 may receive the second data 142 during a radio broadcast period 420. The radio broadcast period 420 may overlap the first transmission period 410. In the example of FIG. 4, the radio broadcast period 420 begins at the time t2 and ends at the time t5. The second data 142 may include one or more portions of the second transmitted copy of the first data 140, one or more portions of the third transmitted copy of the first data 140, one or more portions of the first transmitted copy of the third data 440, or a combination thereof. It should be understood that the radio broadcast period 420 may begin prior to, at, or subsequent to the first time t1, and may end prior to, at, or subsequent to the time t4. For example, the radio broadcast period 420 may begin prior to the time t4 and may end subsequent to the time t1. The error detector 112 of FIG. 1 may compare the first data 140 to the second data 142 to determine whether an error is detected in transmission of the first data 140, as described with reference to FIGS. 1-3.

Referring to FIG. 5, a chart is shown and generally designated 500. The chart 500 illustrates an example of analysis times and data timestamps corresponding to operations of the system 100 of FIG. 1. The chart 500 includes a column of examples of an analysis time 502, a column of examples of the timestamp 182, and a column of examples of the timestamp 172, as described with reference to FIG. 1.

Each row of the chart 500 may correspond to an error detection analysis performed by the error detector 112. For example, a first row 504 indicates that the error detector 112 performed, at 5:15:30 AM on Sep. 23, 2016, a comparison of the first data 140 and the second data 142, where the first data 140 had a timestamp of 5:08 AM on Sep. 23, 2016 and the second data 142 had a timestamp of 5:15 AM on Sep. 23, 2016. Thus, the first row 504 indicates that transmission of the first data 140 (or a particular copy of the first data 140) was initiated at approximately 5:08 AM and that the receiver device 110 received (e.g., ended receiving) the second data 142 at 5:15 AM.

Figure 6:
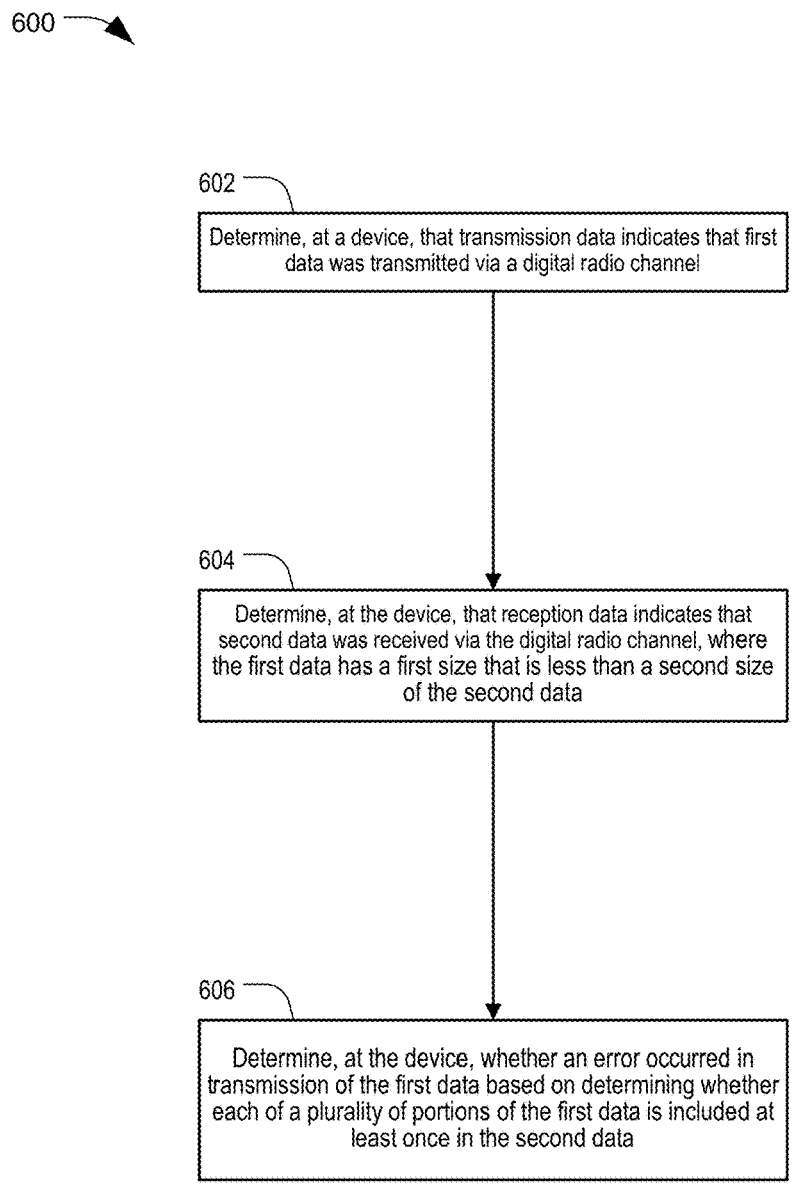
FIG. 6 is a flow chart to illustrate an aspect of a method of detecting errors in data communicated over a digital radio channel.

Referring to FIG. 6, a particular example of a method of error detection is shown and generally designated 600. The method 600 may be performed by the error detector 112, the analysis device 102, the system 100 of FIG. 1, or a combination thereof.

The method 600 includes determining, at a device, that transmission data indicates that first data was transmitted via a digital radio channel, at 602. For example, the error detector 112 of FIG. 1 may determine that the transmission data 170 indicates that the first data 140 was transmitted via the digital radio channel 174, as described with reference to FIG. 1.

The method 600 also includes determining, at the device, that reception data indicates that second data was received via the digital radio channel, at 604. For example, the error detector 112 of FIG. 1 may determine that the reception data 180 indicates that the second data 142 was received via the digital radio channel 174, as described with reference to FIG. 1. The first data 140 is smaller than the second data 142. For example, the first data 140 has a first size that is less than a second size of the second data 142.

The method 600 further includes determining, at the device, whether an error occurred in transmission of the first data based on determining whether each of a plurality of portions of the first data is included at least once in the second data, at 606. For example, the error detector 112 of FIG. 1 may determine whether an error occurred in transmission of the first data 140 based on determining whether each of a plurality of portions (e.g., A, B, C) of the first data 140 is included at least once in the second data 142, as described with reference to FIGS. 1-2.

The method 600 thus enables performing error detection in transmission of the first data 140 based on a comparison of the first data 140 and the second data 142. The first data 140 may be smaller than the second data 142. For example, the second data 142 may correspond to multiple transmitted copies of the first data 140. The error detection may be based on determining whether each portion of the first data 140 is included at least once in the second data 142. With few (e.g., no) transmission errors in transmission of the multiple copies of the first data 140, sequential processing of the second data 142 may efficiently detect whether each portion of the first data 140 is included at least once in the second data 142.

An error may be detected in transmission of the first data 140 in response to determining that, for at least one portion of the first data 140, a matching portion is not detected in the second data 142. In some cases, e.g., as described with reference to Example 5 of FIG. 2, sequential processing of the second data 142 may determine that an error is detected in transmission of the first data 140 although each portion of the first data 140 is included at least once in the second data 142. Detecting an error in such cases may be acceptable to take advantage of the efficiency benefits of sequential processing of the second data 142, in contrast to comparing each portion of the first data 140 to each portion of the second data 142. Alternatively, a more computationally complex (e.g., Order $N^2$ instead of Order N) error detection method may be used so that out-of-order portions are not detected as erroneous, and a receiver device may reorder portions based on sequence numbers.

Figure 7:
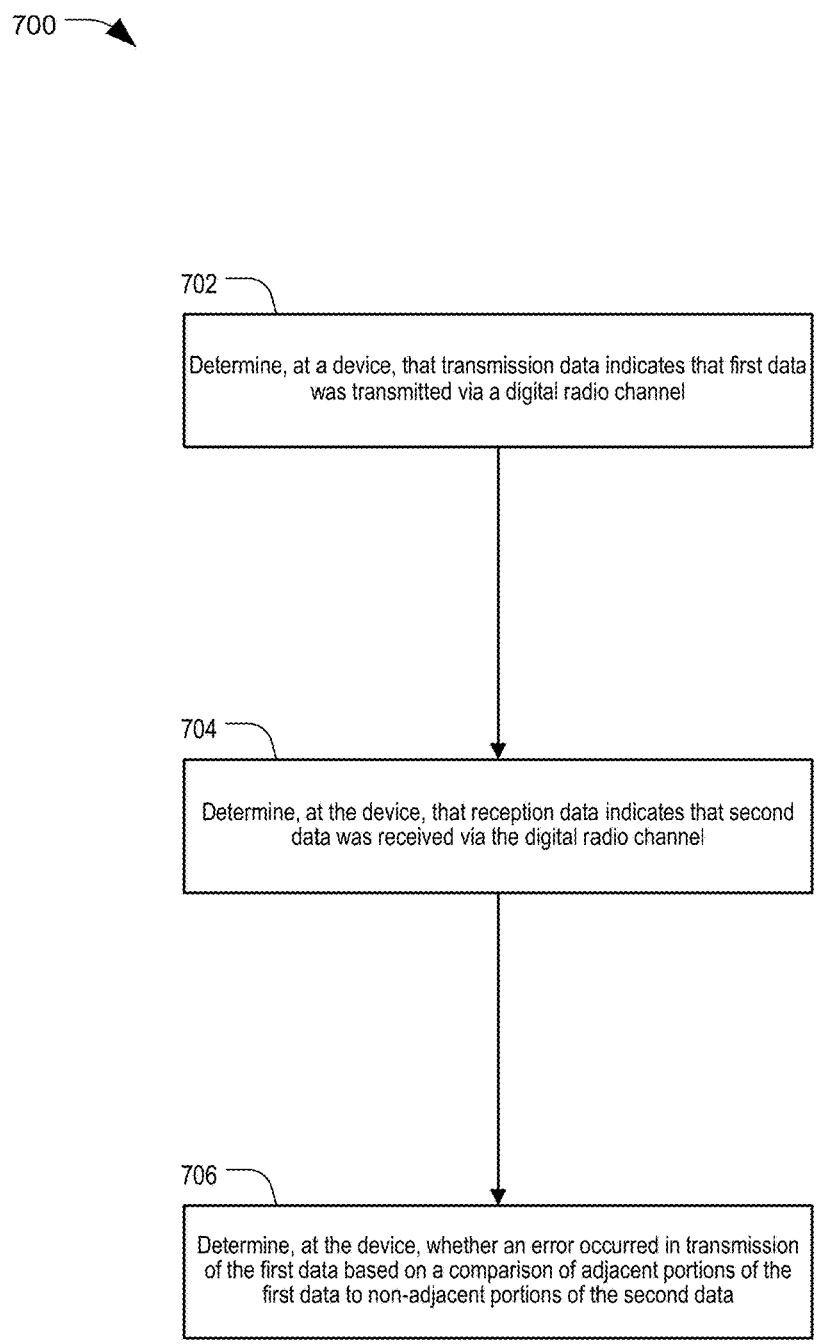
FIG. 7 is a flow chart to illustrate an aspect of another method of detecting errors in data communicated over a digital radio channel.

Referring to FIG. 7, an example of a method of error detection is shown and generally designated 700. The method 700 may be performed by the error detector 112, the analysis device 102, the system 100 of FIG. 1, or a combination thereof.

The method 700 includes determining, at a device, that transmission data indicates that first data was transmitted via a digital radio channel, at 702. For example, the error detector 112 of FIG. 1 may determine that the first data 140 was transmitted via the digital radio channel 174, as described with reference to FIG. 1.

The method 700 also includes determining, at the device, that reception data indicates that second data was received via the digital radio channel, at 704. For example, the error detector 112 of FIG. 1 may determine that the reception data 180 indicates that the second data 142 was received via the digital radio channel 174, as described with reference to FIG. 1.

The method 700 further includes determining, at the device, whether an error occurred in transmission of the first data based on a comparison of adjacent portions of the first data to non-adjacent portions of the second data, at 706. For example, the error detector 112 of FIG. 1 may determine whether an error occurred in transmission of the first data 140 based on a comparison of adjacent portions of the first data 140 to non-adjacent portions of the second data 142, as described with reference to Examples 2 and 4 of FIG. 2.

The method 700 thus enables performing error detection in transmission of the first data 140 based on a comparison of adjacent portions of the first data 140 and non-adjacent portions of the second data 142. The ability to match adjacent portions of the first data 140 to non-adjacent portions of the second data 142 may result in fewer false positives (e.g., Example 2 of FIG. 2 may be correctly identified as not erroneous).

Figure 8:
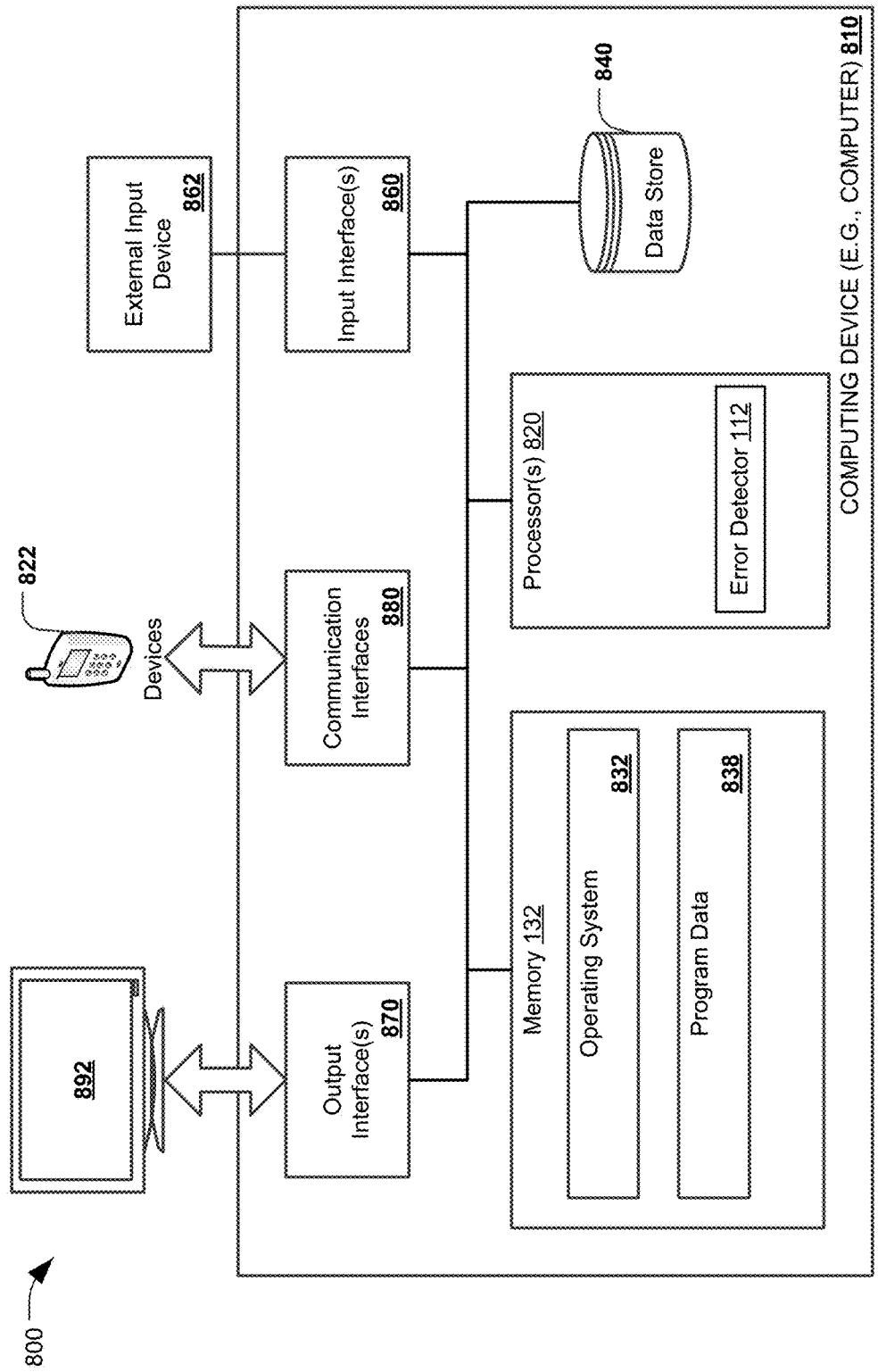
FIG. 8 is a block diagram of a device operable to perform digital radio channel error detection in accordance with the systems, devices, and methods of FIGS. 1-7.

FIG. 8 is a block diagram of a computing environment 800 including a computing device 810 that is operable to support aspects of computer-implemented methods, computer program products, and system components according to the present disclosure.

The computing device 810 includes at least one processor 820 and the memory 132 (e.g., a system memory). For example, the computing device 810 may be a desktop computer, a laptop computer, a tablet computer, a server, a cloud computing device, or any other fixed or mobile computing device. The at least one processor 820 may include the error detector 112. Depending on the configuration and type of computing device, the memory 132 may include volatile (such as random access memory or "RAM"), non-volatile (such as read-only memory or "ROM," flash memory, and similar memory devices that maintain stored data even when power is not provided), a combination thereof, or some other memory. The memory 132 may store an operating system 832, program data 838, or both. The program data 838 may include the transmission data 170, the reception data 180, the first data 140, the second data 142, or a combination thereof. In an illustrative aspect, the computing device 810 may correspond to the analysis device 102 of FIG. 1.

The computing device 810 may also have additional features or functionality. For example, the computing device 810 may also include removable and/or non-removable additional data storage devices, such as magnetic disks, optical disks, tape, and memory cards. Such additional storage is illustrated in FIG. 8 by a data store 840. Computer-readable or processor-readable storage media may include volatile and/or non-volatile storage and removable and/or non-removable media implemented in any technology for storage of information such as computer-readable instructions, data structures, program components or other data. The memory 132 and the data store 840 are examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, and other non-transitory media that can be used to store information and that can be accessed by the computing device 810. Any such computer storage media may be part of the computing device 810.

The computing device 810 may also have one or more input devices, such as an external device 862 connected via one or more input interfaces 860. One or more output devices, such as an illustrative display device 892, speakers, a printer, etc. may also be connected to the computing device 810 via one or more output interfaces 870. The input interfaces 860 and the output interfaces 870 may each include one or more wired or wireless interfaces, such as a universal serial bus (USB) interface, a video graphics array (VGA) interface, a serial interface, a digital visual interface (DVI), a high-definition multimedia interface (HDMI), or some other interface. In certain aspects, such as when the computing device 810 is a server, the input interfaces 860 and the output interfaces 870 may not be included. The computing device 810 has one or more communication interfaces 880 that enable the computing device 810 to communicate (e.g., via a network) with other computing devices 822, such as the receiver device 110, the provider device 104, the station 106, the monitor device 114 of FIG. 1, or a combination thereof.

Particular aspects of disclosed techniques may be implemented in conjunction with a client-server architecture. To illustrate, the computing device 810 may be an application server or other server that provides digital radio channel transmission error detection. The provider device 104 may provide transmission data 170 indicating the first data 140 to the server for error detection based on a comparison with the second data 142 indicated by the reception data 180. The server may provide the error notification 134 to the monitor device 114 indicating whether an error is detected in transmission of the first data 140, as described with reference to FIG. 1. The monitor device 114 may perform various operations based on the whether the error notification 134 indicates that an error is detected in transmission of the first data 140.

It will be appreciated that not all of the components or devices illustrated in FIG. 8 or otherwise described in the previous paragraphs are necessary to support aspects as herein described. It will also be appreciated that the computing device 810 may have additional or different components or devices than illustrated in FIG. 8 or otherwise described in the previous paragraphs.

Although the exemplary aspects described herein are intended to enable a person skilled in the art to practice such aspects, it should be understood that other aspects may be realized and that logical and physical changes may be made without departing from the scope of the present disclosure. Thus, the detailed description herein is presented for purposes of illustration only.

In one aspect, portions of the present disclosure may be implemented using a system that includes a software module, logic engines, computer hardware, databases, and/or computer networks. Moreover, while the description may make reference to specific technologies, system architectures, and data management techniques, it will be appreciated that other devices and/or methods that use different technologies, architectures, or techniques may be implemented without departing from the scope of the disclosure. This disclosure is intended to cover any and all subsequent adaptations or variations of various aspects.

As will be appreciated by one skilled in the art, some aspects may be embodied as a system, method, or computer program product. Accordingly, some aspect may take the form of an entirely hardware implementation, an entirely software implementation (including firmware, resident software, micro-code, etc.) or a combination of software and hardware aspects that may all generally be referred to herein as a "circuit," "module," or system." Furthermore, some aspects may take the form of a computer program product embodied in a tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency (RF), etc. Computer program code for carrying out operations of the disclosure may be written in any combination of one or more programming languages, including an object-oriented programming language, such as Java, Smalltalk, C++, or the like, and conventional procedural programming languages, such as the "C" programming language, or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various aspects are described with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create mans for implementing the functions/acts specified in the flowchart and/or block diagram block or blocks. The computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in FIGS. 1-8 illustrate the architecture, functionality, and operation of possible implementations of systems, methods, and computer program products according to various disclosed aspects. In this regard, each block in the flowchart or block diagrams may represent a module, a segment, or a portion of code, which includes one or more executable instructions for implementing the specified logical function(s). It should also be noted that, in some alternative implementations, the functions noted in the block may occur out of order noted in the FIGS. 1-8. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope and spirit of this technology. Some implementations were chosen and described in order to explain the principles and practical application, and to enable others of ordinary skill in the art to understand various implementations with various modifications as are suited to particular uses contemplated.

The Abstract is not intended to be used in interpreting or limiting the scope or meaning of the claims. In addition, the disclosure is not to be interpreted as indicating that the claimed aspects require more features than are expressly recited in each claim. Thus, the present disclosure is not intended to be limited to the aspects shown herein but is to be accorded the widest scope possible consistent with the principles and novel features as defined by the following claims.

The invention claimed is:

1. A method comprising:
   determining, at a device, that transmission data indicates that first data was transmitted via a digital radio channel, the first data transmitted concurrently with transmission of an analog signal;
   determining, at the device, that reception data indicates that second data was received via the digital radio channel, wherein the first data has a first size that is less than a second size of the second data; and
   determining, at the device, that an error occurred in transmission of the first data based on a comparison of adjacent portions of the first data to non-adjacent portions of the second data; and
   in response to determining that the error occurred in transmission of the first data:
      initiating display of a default image concurrently with output of an audio signal, the audio signal corresponding to the analog signal; and
      initiating retransmission of the first data to cause second particular data to be output subsequent to the output of the default image, wherein the second particular data corresponds to the retransmitted first data.

2. The method of claim 1, wherein the digital radio channel corresponds to a particular frequency modulation (FM) frequency or a particular amplitude modulation (AM) frequency.

3. The method of claim 1, wherein the transmission data indicates that the first data was transmitted during a radio broadcast period, and wherein the reception data indicates that the second data was received during the radio broadcast period.

4. The method of claim 1, wherein the first data is retransmitted during a second radio broadcast period, wherein the second particular data is received during the second radio broadcast period, and wherein the first data includes at least one of traffic data, weather data, image data, album art data, or station logo data.

5. The method of claim 1, wherein the first data was transmitted via the digital radio channel using an in-band on-channel (IBOC) signal.

6. The method of claim 1, wherein the first data was transmitted multiple times via the digital radio channel during a radio broadcast period.

7. The method of claim 1, further comprising receiving, from a provider device, the first data and the transmission data, the transmission data indicating that the provider device initiated transmission of the first data via the digital radio channel during a radio broadcast period.

8. The method of claim 1, further comprising receiving, from a receiver device, the second data and the reception data, the reception data indicating that the receiver device received the second data via the digital radio channel during a radio broadcast period.

9. The method of claim 1, wherein the audio signal is output during a time period, wherein the default image is output during a first portion of the time period, and wherein retransmission of the first data causes the second particular data to be output during a second portion of the time period.

10. The method of claim 1, further comprising:
    comparing a first portion of the first data to a first particular portion of the second data;
    in response to determining that the first portion of the first data matches the first particular portion of the second data, comparing a second portion of the first data to a second particular portion of the second data; and
    in response to determining that the first portion of the first data does not match the first particular portion of the second data, comparing the first portion of the first data to the second particular portion of the second data.

11. The method of claim 10, wherein the first portion of the first data is adjacent to the second portion of the first data, and wherein the first particular portion of the second data is adjacent to the second particular portion of the second data.

12. A system comprising:
    a processor configured to:
       determine that transmission data indicates that first data was transmitted via a digital radio channel, the first data transmitted concurrently with transmission of an analog signal;
       determine that reception data indicates that second data was received via the digital radio channel;
       determine that an error occurred in transmission of the first data based on a comparison of adjacent portions of the first data to non-adjacent portions of the second data; and in response to determining that the error occurred in transmission of the first data, initiate retransmission of the first data to cause second particular data to be output concurrently with output of an audio signal, wherein the second particular data corresponds to the retransmitted first data, and wherein the audio signal corresponds to the analog signal.

13. The system of claim 12, wherein the first data has a first size that is less than a second size of the second data.

14. The system of claim 12, wherein the processor is further configured to generate an alert message in response to determining that the error occurred in transmission of the first data.

15. The system of claim 14, wherein the processor is further configured to store the alert message in a memory, provide the alert message to a display, provide the alert message to another device, or a combination thereof.

16. The system of claim 12, wherein the processor is further configured, in response to determining that the error occurred in transmission of the first data, to initiate display of a default image prior to output of the second particular data.

17. The system of claim 12, further comprising a receiver configured to receive the first data and the transmission data from a provider device, the transmission data indicating that the provider device initiated transmission of the first data via the digital radio channel during a radio broadcast period.

18. The system of claim 12, further comprising a receiver configured to receive the second data and the reception data from a receiver device, the reception data indicating that the receiver device received the second data via the digital radio channel during a radio broadcast period.

19. A computer-readable storage device storing instructions that, when executed by a processor, cause the processor to perform operations comprising:
   determining that transmission data indicates that first data was transmitted via a digital radio channel, the first data transmitted concurrently with transmission of an analog signal;
   determining that reception data indicates that second data was received via the digital radio channel, wherein the first data has a first size that is less than a second size of the second data;
   determining that an error occurred in transmission of the first data based on determining whether each of a plurality of portions of the first data is included at least once in the second data; and
   in response to determining that the error occurred in transmission of the first data, initiating retransmission of the first data to cause second particular data to be output concurrently with output of an audio signal, wherein the second particular data corresponds to the retransmitted first data, and wherein the audio signal corresponds to the analog signal.

20. The computer-readable storage device of claim 19, wherein the digital radio channel corresponds to a particular frequency modulation (FM) frequency or a particular analog modulation (AM) frequency.

* * * * *